June 9, 1953   J. C. SYLVESTER   2,641,100
ROTARY CUTTING DISK TYPE LAWN MOWER
Filed July 11, 1951
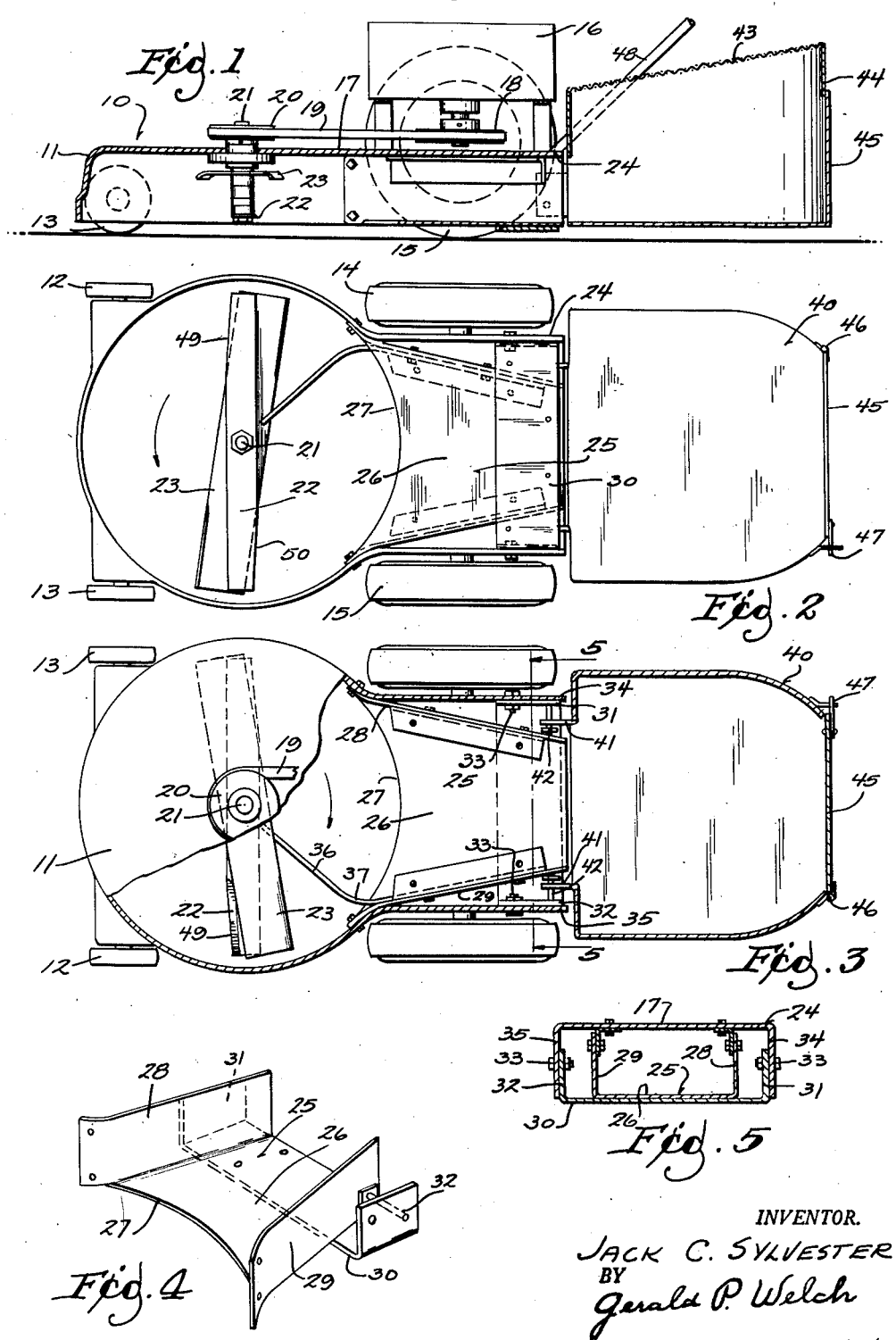
INVENTOR.
JACK C. SYLVESTER
BY
Gerald P. Welch
ATTORNEY Patented June 9, 1953

2,641,100

UNITED STATES PATENT OFFICE 2,641,100

ROTARY CUTTING DISK TYPE LAWN MOWER

Jack C. Sylvester, Milwaukee, Wis.

Application July 11, 1951, Serial No. 236,139

5 Claims. (Cl. 56—255)

This invention relates to improvements in rotary lawn mowers and more particularly to a novel rotary lawn mower equipped with a grass catcher.

An object of the invention is to provide a device of the type which will draw the grass into a covered catcher through means especially provided for the purpose.

Another object of the invention is to provide a rotary blade having a deflector in combination with guides and funnel means adapted for conveying the cut grass and debris into a grass catcher.

Other and further objects of the invention will appear as the description proceeds, reference being had to the accompanying drawing, in which:

Fig. 1 is a side view in vertical section of a rotary lawn mower embodying the invention.

Fig. 2 is an inverted plan view of the same.

Fig. 3 is a top plan view partly in section.

Fig. 4 is a detail view of the funnel structure.

Fig. 5 is a view on line 5—5 of Fig. 3.

Referring more particularly to the drawings, the numeral 10 refers to the device generally, having a housing 11 supported on free running front wheels 12 and 13 and the larger rear wheels 14 and 15. A gasoline engine 16 is supported on the top side 17 of the housing 11 and in the form shown, is connected by a pulley 18 and the belt 19 to a pulley 20 fixed to a pintle 21 which carries the cutter bar 22. A deflector member 23 slightly on a bias with respect to the cutter bar 22 is fixed near the upper end of the pintle 21 and serves to deflect the cut grass downwardly. Under the rear portion 24 of the housing 11 a flat funnel-shaped structure 25 is provided having a floor portion 26 widest at its forward end 27 and flanked by the side walls 28 and 29. A channel-shaped bracket 30 has upturned ends 31 and 32 which are bolted as at 33 to the side walls 34 and 35 of the rear portion 24 of said housing 11. A guide element 36 forms a front continuation of the side wall 29, is inwardly curved at 37, and extends radially toward the pintle 21 stopping short thereof. A grass catcher 40 is attached by means 41 to the pin 42 held between the side walls 28 and 29 and the channel formed bracket ends 31 and 32. The grass catcher basket 40 has a screen top 43 to retain the grass within said basket as the rotary cutter gives rise to a strong draft of air. In the back wall 44 of the basket 40 is a door 45 hinged at 46 thereof and provided with conventional latch means 47.

In use, the device 10 is pushed by handle means 48 in the usual manner. The gas engine 16 will rotate the spindle 21 and the cutter bar 22 which has the usual oppositely disposed blade elements 49 and 50, will cut the grass. The blades have a tendency to throw the cuttings upwardly, and the deflector member 23 obviates this. The guide 36 helps to divert the cuttings backwardly through the funnel portion 25 into the basket 40, which may be emptied through the door 45 without removal of the basket from the lawn mower.

It will be understood that the device is capable of many modifications in structure and design, without departing from the spirit of the invention, within the scope of the appended claims.

Having thus described the invention, what is claimed and desired to be secured by Letters Patent of the United States, is:

1. A lawn mower assembly comprising a mobile casing having a semi-circular forward portion, a power driven rotatable pintle mounted in said forward portion and extending vertically in the axis of said casing, said pintle carrying a planar cutting blade on its lower end for grass cutting, said casing including a throat of co-equal depth and having a pair of side walls and a bottom wall extending rearwardly from said forward portion and connected to said portion to complete the circular contour of the latter, one of the side walls of the throat extending to the vicinity of the axis of rotation of the cutting blade to form a guide wall for directing cut grass into said throat, a grass deflector carried by said pintle in the upper portion of said casing remote from the cutting blade but substantially parallel thereto, said deflector being elongated and having its direction of length biased with respect to the direction of length of the cutting blade, said deflector being cooperative with the throat guide wall in advancing cut grass into the throat, the rotation of said blade and deflector creating a draft into the throat to cause advance of the cut grass through the throat, and a grass-catching basket mounted on said casing rearwardly of the throat.

2. An assembly as in claim 1 characterized in that the cutting blade is elongated with the pintle mounted in a mid portion of the blade length, the respective cutting edges of the blade being on opposite sides of the blade length, said deflector also being substantially planar and of greater width than the width of the cutting blade, the advance edge of an end portion of the deflector being substantially aligned with the blade cutting edge, the excess width of the deflector forming a trailing portion active to increase the air-draft path.

3. An assembly as in claim 2 characterized in that opposite edges of an end portion of the grass deflector include downturned extensions active in directing the air flow downwardly within the throat.

4. An assembly as in claim 1 characterized in that the front edge of the lower wall of the throat is shaped complementary to the incomplete circular casing to thereby complete the casing contour, the distance between the side walls of the throat being greatest in such forward portion of the throat.

5. An assembly as in claim 1 characterized in that the rear open end of the throat is of less width than the forward portion of the basket and is positioned symmetrical to the basket width, the rear wall of the basket including a wall openable at will to permit free removal of the cut grass collected in the basket.

JACK C. SYLVESTER.

References Cited in the file of this patent

UNITED STATES PATENTS

| Number | Name | Date |
|---|---|---|
| 1,336,257 | Muzzy | Apr. 6, 1920 |
| 2,055,724 | Irgens | Sept. 29, 1936 |
| 2,071,872 | Cockburn | Feb. 23, 1937 |
| 2,361,637 | Lathrop | Oct. 31, 1944 |
| 2,505,952 | Fergason | May 2, 1950 |